United States Patent
Thomas

(10) Patent No.: US 9,195,475 B2
(45) Date of Patent: Nov. 24, 2015

(54) DATA RELAY BY SERVER

(71) Applicant: Hewlett-Packard Development Company, L.P., Houston, TX (US)

(72) Inventor: Donald Kevin Thomas, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 13/874,774

(22) Filed: May 1, 2013

(65) Prior Publication Data

US 2014/0331036 A1     Nov. 6, 2014

(51) Int. Cl.
  *G06F 9/00*     (2006.01)
  *G06F 15/177*   (2006.01)
  *G06F 9/44*     (2006.01)

(52) U.S. Cl.
  CPC .................................... *G06F 9/4416* (2013.01)

(58) Field of Classification Search
  CPC .................................. G06F 9/50; G06F 15/173
  USPC ......................................................... 713/1, 2
  See application file for complete search history.

(56) References Cited

U.S. PATENT DOCUMENTS

| | | | |
|---|---|---|---|
| 6,085,244 A * | 7/2000 | Wookey | 709/224 |
| 7,313,690 B2 | 12/2007 | Miller | |
| 7,743,242 B2 | 6/2010 | Oberhaus et al. | |
| 7,895,424 B1 | 2/2011 | Miyamoto et al. | |
| 2004/0199815 A1* | 10/2004 | Dinker et al. | 714/21 |
| 2006/0069950 A1* | 3/2006 | Stephens et al. | 714/18 |
| 2006/0179363 A1* | 8/2006 | LaBanca et al. | 714/57 |
| 2007/0027973 A1 | 2/2007 | Stein et al. | |
| 2008/0127172 A1* | 5/2008 | Dawson et al. | 717/174 |
| 2009/0217163 A1* | 8/2009 | Jaroker | 715/700 |
| 2011/0107074 A1* | 5/2011 | Chan et al. | 713/2 |
| 2011/0302298 A1* | 12/2011 | Lawrance et al. | 709/224 |
| 2012/0151066 A1* | 6/2012 | Brown et al. | 709/226 |
| 2013/0152074 A1* | 6/2013 | Yeh | 717/178 |

OTHER PUBLICATIONS

Intel Enterprise. Platform & Services Division—Market; "Intel(r) Deployment Assistant 3.6 Release Notes"; Aug. 24, 2010; 3 pages.

* cited by examiner

*Primary Examiner* — Vincent Tran
(74) *Attorney, Agent, or Firm* — Hewlett-Packard Patent Department

(57) ABSTRACT

Example embodiments relate to data relay by a server. In one example implementation, a master server may load a temporary operating system and a slave server may load a temporary operating system. The master server may then receive a command from a user via a user interface of a computing device. The master server may relay the command received from the user to the slave server.

15 Claims, 6 Drawing Sheets

DATA RELAY BY SERVER

BACKGROUND

Companies with large amounts of data need many servers for storing and processing the data. The servers may need to be tested to ensure that the servers are healthy and performing properly at the time the servers are installed.

BRIEF DESCRIPTION OF THE DRAWINGS

The following detailed description references the drawings, in which.

DETAILED DESCRIPTION

Large companies and organizations are purchasing higher server density racks to manage their data and applications. When the servers are delivered to the customer, the customer often requests that the servers be tested to ensure that they are functioning properly. As a result, rack level health checks (often times collecting hundreds of data points per server) and IT tests (e.g., CPU load tests, disk stress tests, network performance and connectivity tests, etc.) may be performed to ensure the health and functionality of each of the individual servers. The task of performing these checks and tests can be expensive and time consuming and can be even more complicated when the servers vary in configuration. For example, these heterogeneous servers may vary in operating system, software, and/or hardware configurations, making testing difficult.

In order to test these systems, traditionally, a server manufacturer may send an engineer on-site to run these tests, but this increases the costs to the server manufacturer and its customer. Current solutions require that the servers be identical (homogenous), require that a full operating system be installed on each server, and/or do not scale across multiple servers. For example, with current solutions, an engineer with an understanding of the Linux or Unix operating system may be desired. However, such engineers are expensive and in short supply.

Consequently, a simplified system designed for a local customer engineer to run the health checks and IT tests may be desired. Moreover, it may be desirable for the system to operate across a deployment of heterogeneous servers. It may also be desirable to perform the health checks and IT tests on systems without installing and configuring a complete operating system or without disturbing a pre-installed operating system.

Various embodiments described herein are directed to testing multiple servers by relaying data by and between the multiple servers and a computing device. As will be understood from the present disclosure, a computing device may be used to test multiple servers by causing the servers to install a temporary operating system from a memory device and by causing the servers to perform various system tests.

For example, in some implementations, thousands of heterogeneous or homogenous servers may be tested simultaneously. In another example, operating systems may not need to be installed on the servers prior to testing. In yet another example, the complexity of a Linux or Unix command line is avoided in order to test, diagnose, or manage the servers. These and other advantages will be apparent from the description that follows.

Figure 1:
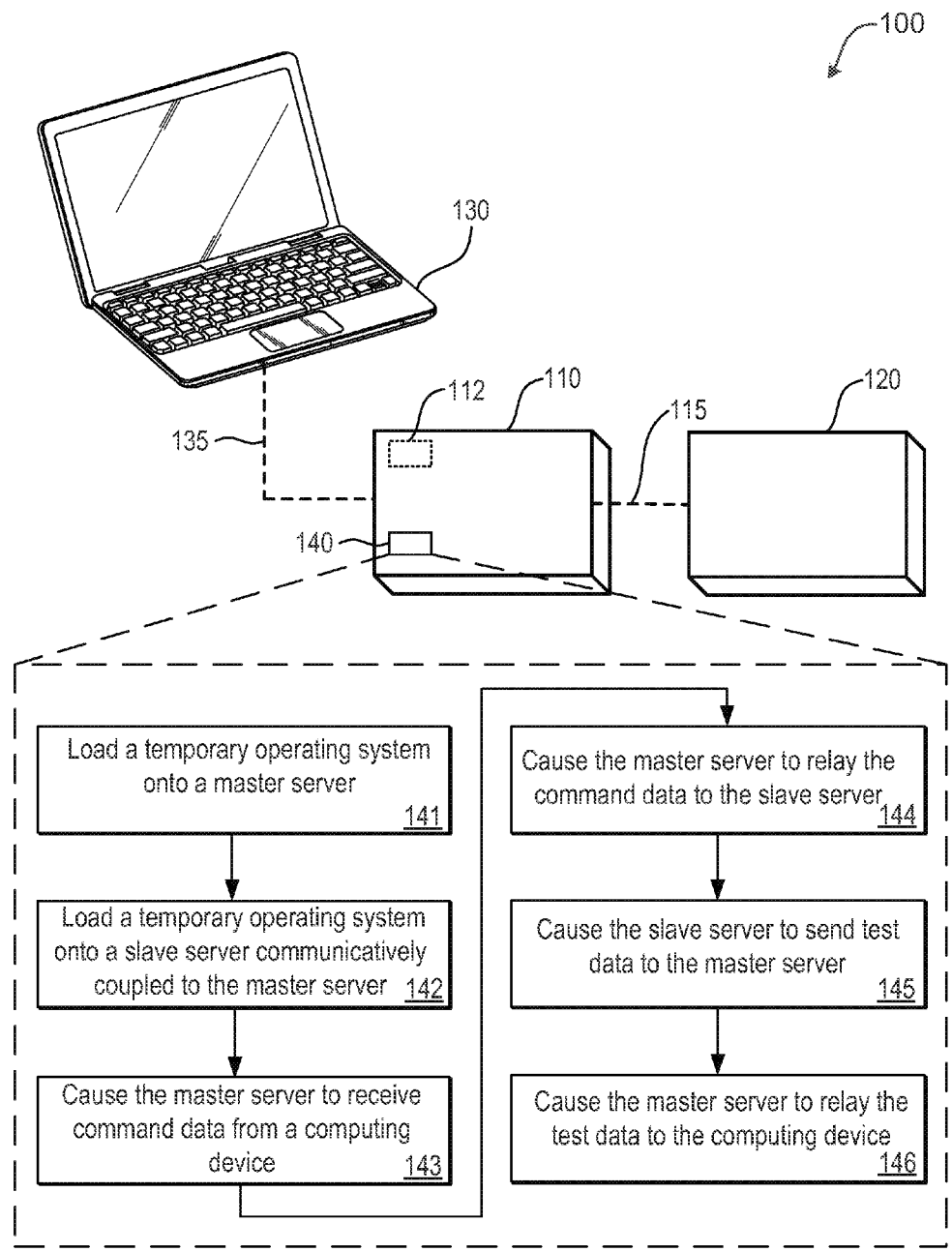
FIG. 1 illustrates a system for data relay by a master server for testing a server according to examples of the present disclosure.

FIG. 1 illustrates a system 100 for data relay by a master server 110 for testing a server according to examples of the present disclosure. The system 100 may include a master server 110, a slave server 120 communicatively coupled to the master server 110 by a network 115, a computing device 130 communicatively coupled to the master server by a network 135, and a memory device 140 communicatively coupled to the master server 110. In one example, the network 115 and the network 135 may be the same network, or may be different networks in another example.

The master server 110 may include a processor 112 that may be configured to process instructions. The instructions may be stored on a non-transitory tangible computer-readable storage medium, such as memory device 140, or on a separate device (not shown), or on any other type of volatile or non-volatile memory that stores instructions to cause a programmable processor to perform the techniques described herein. Alternatively or additionally, the example master server 110 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein, hi some implementations, multiple processors may be used, as appropriate, along with multiple memories and/or types of memory.

The master server 110 may be designated as the master by the presence of the memory device 140. When the memory device 140 is inserted into the master server 110, the memory device 140 may cause the master server 110 to load a temporary operating system from the memory device 140. In one example, if the master server 110 already has an operating system installed, the temporary operating system may be installed in conjunction with the existing operating system such that the existing operating system remains installed and unchanged. In another example, if no existing operating system is installed on master server 110, the temporary operating system may be installed.

The temporary operating system may be a Linux or Unix operating system, in one example, or may be of another suitable type. The temporary operating system may be a simple, bare-bones operating system with only minimum functionality. For example, the temporary operating system may be limited to booting up, communicating with other servers, such as master server 110 and slave server 120, communicating with a computing device such as computing device 130, and performing testing of the servers.

The slave server 120 may be any server communicatively coupled to the master server 110, such as via the network 115. In one example, additional slave servers may be present, as discussed in other examples. The slave server 120 may receive a temporary operating system from the master server 110 or from the memory device 140 via the master server 110. For example, once the master server 110 boots and installs its temporary operating system, the master server 110 may cause the slave server 120 to install a temporary operating system from the memory device 140 (or from the master server 110 directly). In one example, the master server may also assign an Internet protocol (IP) address to the slave server 120 in order to communicate with the slave server 120 via network 115. In this way, the master server 110 may relay data between the computing device 130 and the slave server 120.

The computing device 130 may connect to the master server 110 via the network 135, and the computing device 130 may include a testing application including a set of instructions for testing servers, including the master server 110 and the slave server 120. The computing device 130 may include any appropriate type of computing device, including for example smartphones, tablets, desktops, laptops, workstations, servers, or the like.

The computing device 130 may include a processor and/or a memory. The processor may be configured to process instructions for execution by the computing device 130, such as the testing application. The instructions may be stored on a non-transitory tangible computer-readable storage medium, or on a separate device (not shown), or on any other type of volatile or non-volatile memory that stores instructions to cause a programmable processor to perform the techniques described herein. Alternatively or additionally, the example computing device 130 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

A user may utilize the computing device 130 in order to test the master server 110 and/or the slave server 120 (as well as any additional servers as shown in other embodiments). For example, a set of instructions for testing servers may include performing rack level health checks (often times collecting hundreds of data points per server) and IT tests (e.g., CPU load tests, disk stress tests, network performance and connectivity tests, etc.) to ensure the health and functionality of each of the individual servers. Additionally, the computing device 130 may assign IP addresses to some or all servers, such as master server 110 and/or slave server 120.

The computing device 130 may also scan for all available master servers, such as master server 110, and slave servers, such as slave server 120. Once the servers are identified, the computing device 130 may communicate with these servers as described herein. For example, a user may cause the computing device 130 to perform testing on the servers, and in response the computing device 130 may receive data indicative of the test results from the servers.

The memory device 140 may include instructions that cause the processor 112 to perform the following operations: load a temporary operating system onto a master server 110 (block 141); load a temporary operating system onto a slave server 120 communicatively coupled to the master server (block 142); cause the master server 110 to receive command data from a computing device 130 (block 143); cause the master server 110 to relay the command data received from the user to the slave server (block 144); cause the slave server to send test data to the master server (block 145); and cause the master server to relay the test data to the computing device (block 146). Additional processes also may be included, and it should be understood that the processes depicted in FIG. 1 represent generalized illustrations, and that other processes may be added or existing processes may be removed, modified, or rearranged without departing from the scope and spirit of the present disclosure.

Figure 2:
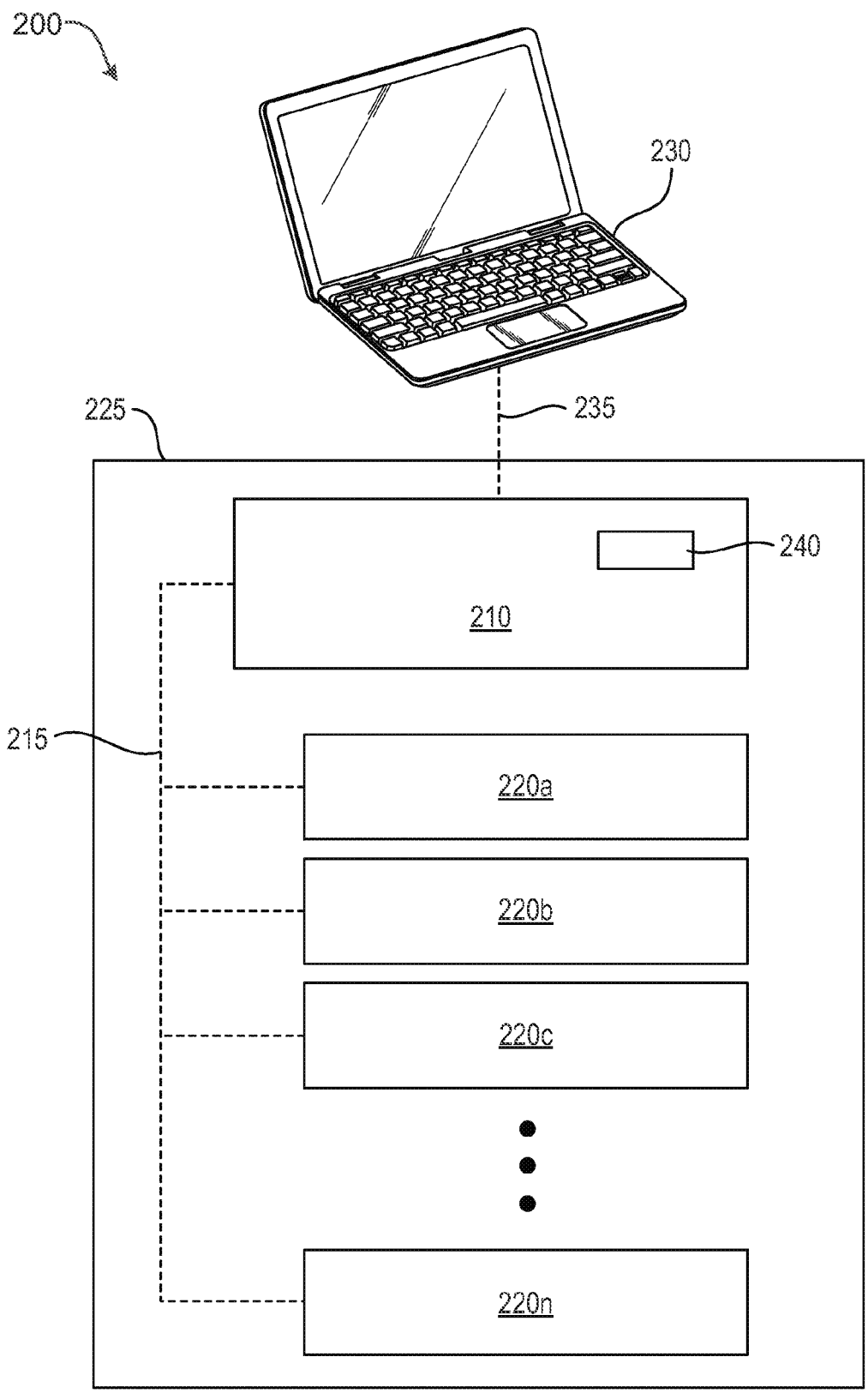
FIG. 2 illustrates a system for data relay by a master server for testing a server according to examples of the present disclosure.

FIG. 2 illustrates a system 200 for data relay by a master server 210 for testing a server according to examples of the present disclosure. The system 200 may include a master server 210; a plurality of slave servers 220*a,b,c,n* communicatively coupled to the master server 210 by a network 215; a computing device 230 communicatively coupled to the master server 210 by a network 235; and a memory device 240 communicatively coupled to the master server 210.

The master server 210 may be designated as the master by the presence of the memory device 240. When the memory device 240 is inserted into the master server 210, the memory device 240 may cause the master server 210 to load a temporary operating system from the memory device 240. In one example, if the master server 210 already has an operating system installed, the temporary operating system may be installed in conjunction with the existing operating system such that the existing operating system remains installed and unchanged. In another example, if no existing operating system is installed on master server 210, the temporary operating system may be installed.

The temporary operating system may be a Linux or Unix operating system, in one example, or may be of another suitable type. The temporary operating system may be a simple, bare-bones operating system with only minimum functionality. For example, the temporary operating system may be limited to booting up, communicating with other servers, such as master server 210 and slave servers 220*a,b,c,n*, communicating with a computing device such as computing device 130, and performing testing of the servers.

The slave servers 220*a,b,c,n* may be any servers communicatively connected to the master server 210, such as via the network 215. The slave servers 220*a,b,c,n* may be of various configurations or may all be of the same configuration. Additionally, the slave servers 220*a,b,c,n* may be of the same or different configuration from the master server 210. Any number of slave servers may be utilized.

In one example, the master server 210 and the slave servers 220*a,b,c,n* may be housed in a rack 225. The slave servers 220*a,b,c,n* may receive a temporary operating system from the master server 210 or from the memory device 240 via the master server 210. For example, once the master server 210 boots and installs its temporary operating system, the master server 210 may cause the slave servers 220*a,b,c,n* to install a temporary operating system from the memory device 240 (or from the master server 210 directly). The slave servers 220*a,b,c,n* may all install the temporary operating system at the same time or one-at-a-time. In one example, the master server may also assign an Internet protocol (IP) address to the slave server 220 in order to communicate with the slave server 220 via network 215. In this way, the master server 210 may relay data between the computing device 230 and the slave servers 220*a,b,c,n*.

The computing device 230 may connect to the master server 210 via the network 235, and the computing device 230 may include a testing application including a set of instructions for testing servers, including the master server 210 and the slave server 220. The computing device 230 may include any appropriate type of computing device, including for example smartphones, tablets, desktops, laptops, workstations, servers, or the like.

The computing device 230 may include a processor and/or a memory. The processor may be configured to process instructions for execution by the computing device 230, such as the testing application. The instructions may be stored on a non-transitory tangible computer-readable storage medium, or on a separate device (not shown), or on any other type of volatile or non-volatile memory that stores instructions to cause a programmable processor to perform the techniques described herein. Alternatively or additionally, the example computing device 230 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

A user may utilize the computing device 230 in order to test the master server 210 and/or the slave servers 220a,b,c,n (as well as any additional servers as shown in other embodiments). For example, the a set of instructions for testing servers may include performing rack level health checks (oftentimes collecting hundreds of data points per server) and IT tests (e.g., CPU load tests, disk stress tests, network performance and connectivity tests, etc.) to ensure the health and functionality of each of the individual servers. Additionally, the computing device 230 may assign IP addresses to some or all servers, such as master server 210 and/or slave servers 220a,b,c,n.

The computing device 230 may also scan for all available master servers, such as master server 210, and slave servers, such as slave servers 220a,b,c,n. Once the servers are identified, the computing device 230 may communicate with these servers as described herein. For example, a user may cause the computing device 230 to perform testing on the servers, and in response the computing device 230 may receive data indicative of the test results from the servers.

Figure 3:
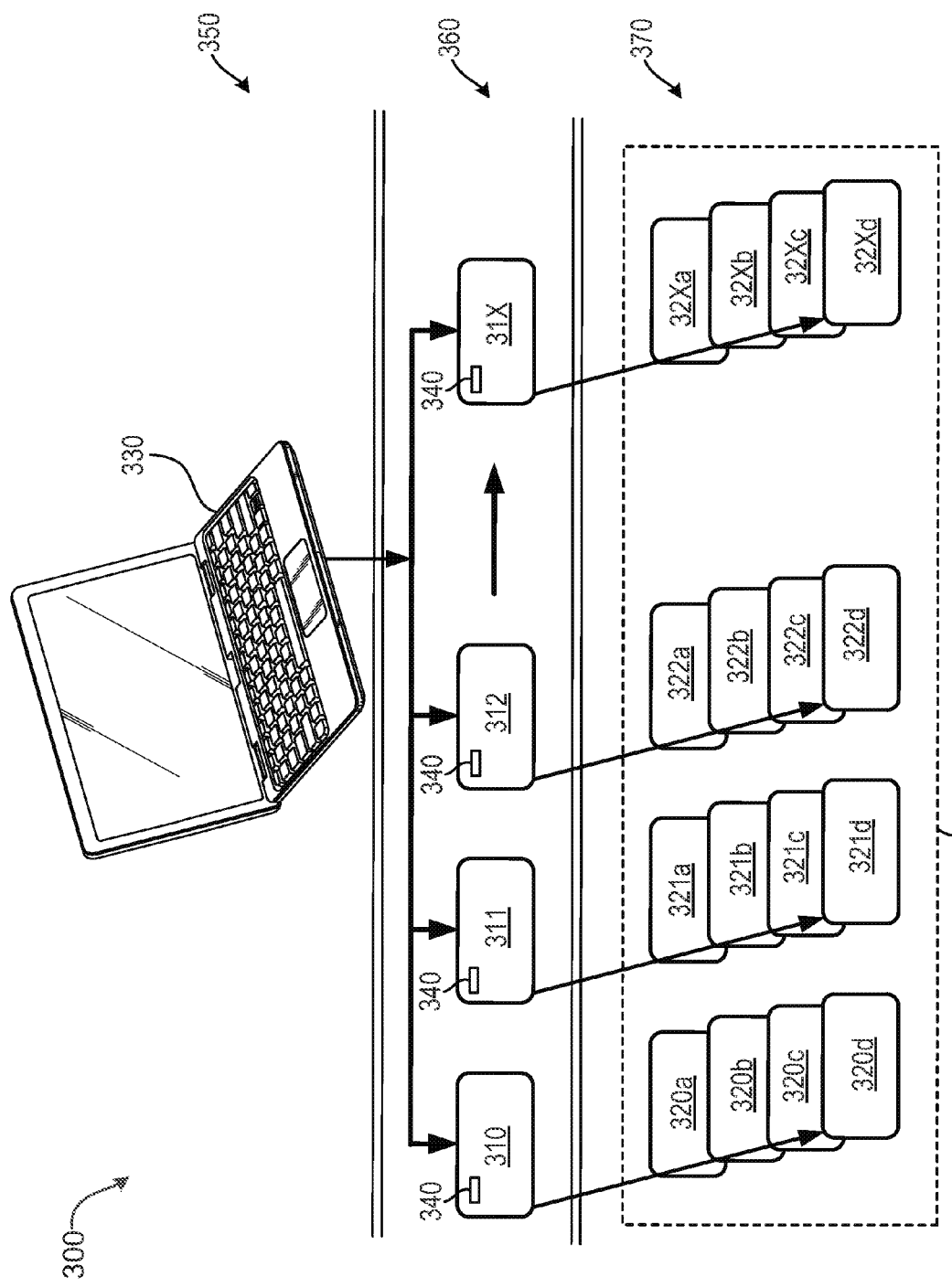
FIG. 3 illustrates a system for data relay by a plurality of master servers for testing a server according to examples of the present disclosure.

FIG. 3 illustrates a system 300 for data relay by a plurality of master servers 310, 311, 312, 31X for testing a server according to examples of the present disclosure. The system 300 may include a plurality master servers 310, 311, 312, 31X; a plurality of slave servers 320a,b,c,d communicatively coupled to the master servers 310, 311, 312, 31X respectively by a network; a computing device 330 communicatively coupled to the master servers 310, 311, 312, 31X; and a memory device 340 communicatively coupled to the master servers 310, 311, 312, 31X.

The master servers 310, 311, 312, 31X may be designated as the masters by the presence of the memory device 340. When the memory device 340 is inserted into the master server 310, the memory device 340 may cause the master server 310 to load a temporary operating system from the memory device 340. In one example, if the master server 310 already has an operating system installed, the temporary operating system may be installed in conjunction with the existing operating system such that the existing operating system remains installed and unchanged. In another example, if no existing operating system is installed on master server 310, the temporary operating system may be installed.

In one example, a single memory device 340 may be used, as it may be inserted in each of the master servers 310, 311, 312, 31X until the respective master server is loaded with a temporary operating system. The memory device 340 may then be inserted into the next master server. In another example, multiple memory devices (not shown) may be used such that they may be inserted in each of the master servers 310, 311, 312, 31X at the same time.

Like the other embodiments, the master servers 310, 311, 312, 31X, once booted and having the temporary operating system installed, may identify the respective slave servers 320 and cause the slave servers to be loaded with the temporary operating system. The master servers 310, 311, 312, 31X and slave servers 320 may all be of the same or different types and/or configurations (both hardware and/or software).

In one example, each master server 310, 311, 312, 31X may assign an IP address to each of its respective slave servers 320. In this way, the slave servers 320 may communicate with their respective master server. For example, slave servers 320a,b,c,d may communicate with master server 310 and vice versa. Similarly, slave servers 321a,b,c,d may communicate with master server 311, and so on. In turn, each of the master servers 310, 311, 312, 31X may communicate with the computing device 330. In this way, the master servers 310, 311, 312, 31X relay data between the computing device 330 and the slave servers 320.

As in other examples, a user may utilize the computing device 330 to perform testing on the servers, including master servers 310, 311, 312, 31X and slave servers 320. As described herein, the present disclosure is scalable in order to perform testing across instances of varying numbers of servers. In its most basic configuration, as shown in FIG. 1, a single master server having a single slave server may be utilized. However, more complicated embodiments are also provided for. For example, a single rack implementation (such as shown in FIG. 2) may utilize a single master server and a plurality of slave servers. In a more complex environment, multiple rack implementations (such as shown in FIG. 3) may utilize multiple master servers, each with its own plurality of slave servers. In each of these examples, a user may utilize the memory device and computing device disclosed herein in order to perform testing on the servers. Other configurations are possible, and these examples should not be seen as limiting but rather as merely illustrative.

As shown in FIG. 3, the computing device 330, master servers 310, 311, 312, 31X, and the slave servers 320 may be divided into three separate communication layers. For example, the computing device may reside in a command layer 350 in which data (such as commands) is broadcast from the computing device 330 in a multi-cast fashion to the master servers 310, 311, 312, 31X, which reside in a transmission layer 360. That is, the data is broadcast to each of the master servers 310, 311, 312, 31X at the same time. The master servers 310, 311, 312, 31X in the transmission layer 360 may then send data to each master server's respective slave servers 320, which reside in the endpoint layer 370, at the same time. For example, master server 310 may broadcast data to slave servers 320a,b,c,d simultaneously. In another example, the computing device 330 may send a message to only one master server at a time, and similarly, a master server may send a message to only one slave server at a time.

Figure 4:
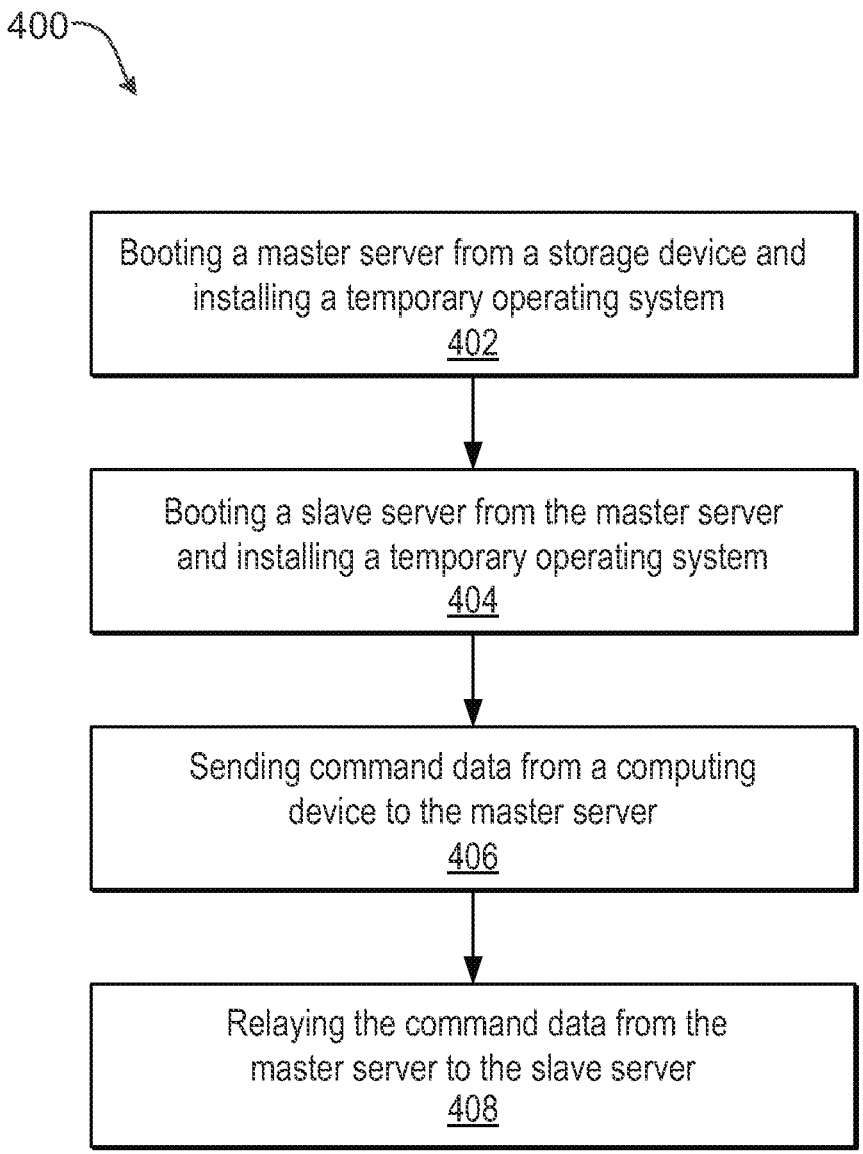
FIG. 4 illustrates a method for data relay by a server according to examples of the present disclosure.

FIG. 4 illustrates a method for data relay by a server according to examples of the present disclosure. The method 400 may be performed by the system shown in FIGS. 1-3, for example, or by another suitable system. The method 400 may include: booting a master server from a storage device and installing a temporary operating system on the master server (block 402); booting a slave server from the master server and installing a temporary operating system on the slave server (block 404); sending data from a computing device to the master server (block 406); and relaying the data from the master server to the slave server (block 408), for example. Additional processes also may be included, and it should be understood that the processes depicted in FIG. 4 represent generalized illustrations, and that other processes may be added or existing processes may be removed, modified, or rearranged without departing from the scope and spirit of the present disclosure At block 402, the master server boots from a storage device, such as the storage device 140 of FIG. 1, for example. This occurs when the storage device is inserted into the master server. Once booted, the master server installs a temporary operating system from the storage device.

At block 404, after the master server boots and installs a temporary operating system, the master server causes the slave server to boot and install a temporary operating system. In one example, the temporary operating system is communicated to the slave server from the storage device by the master server. In another example, the temporary operating system is installed on the slave server from the master server.

At block 406, once the master and slave servers install their respective temporary operating systems, a user may send a command to perform a test from a computing device to the master server. The command could be any number and/or variety of tests designed to test the hardware and/or software configuration of the servers or the servers operating health. In one example, the computing device may send the command to multiple master servers.

At block 408, after the user sends the command to perform a test from the computing device to the master server, the master server relays the command from the master server to the slave server. In one example, the master server may relay the command to multiple slave servers.

Figure 5:
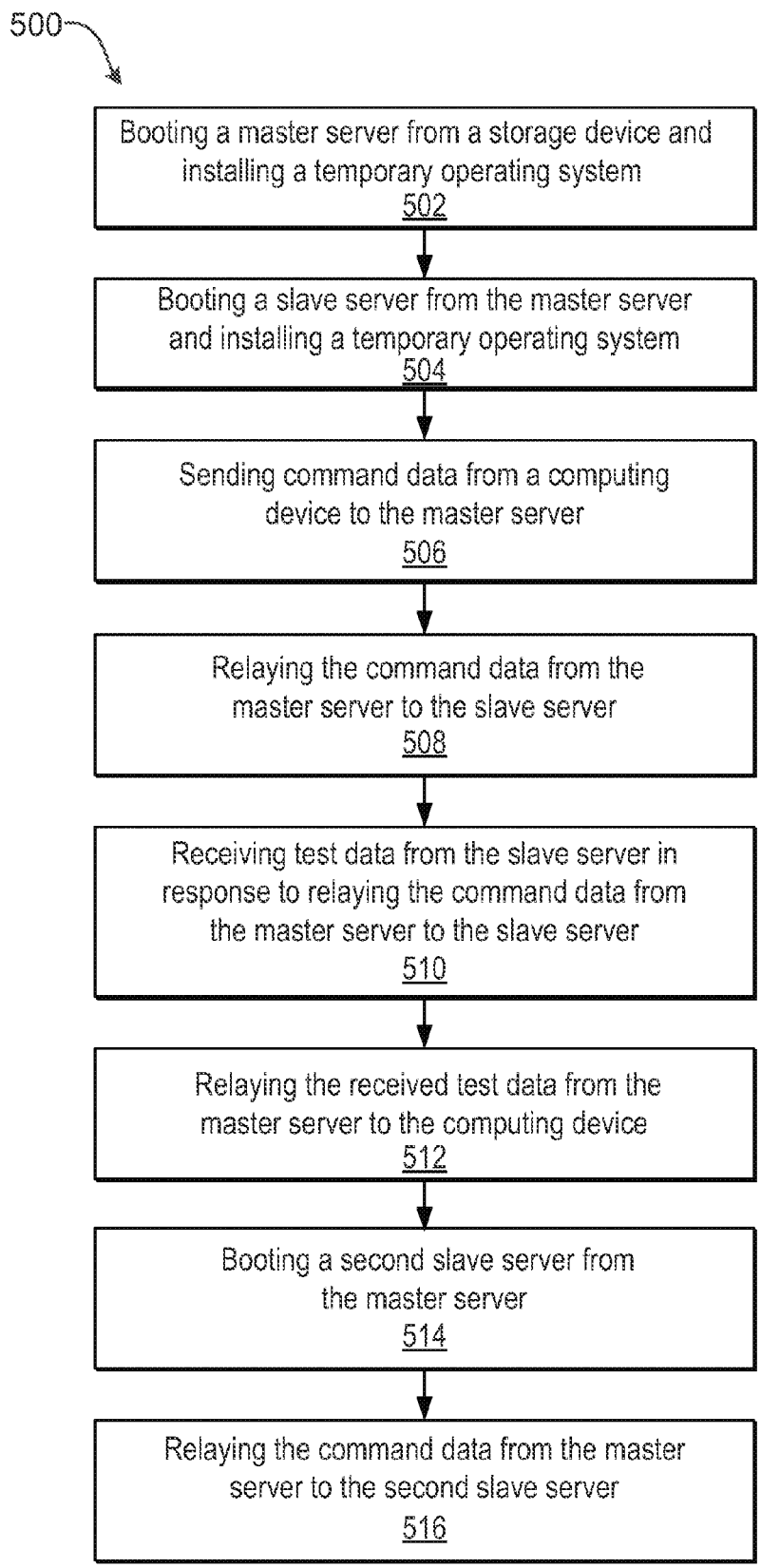
FIG. 5 illustrates a method for data relay by a server according to examples of the present disclosure.

In one example, as shown in FIG. 5, additional processes may be utilized in a method 500 for data relay by a server. In addition to the processes described in relation to FIG. 4, the method 500 may also include: receiving test data from the slave server in response to relaying the command data from the master server to the slave server (block 510); relaying the received test data from the slave server to the computing device by the master server (block 512); booting a second slave server from the master server (block 514); and relaying the command data from the master server to the second slave server (block 516). Additional processes also may be included, and it should be understood that the processes depicted in FIG. 5 represent generalized illustrations, and that other processes may be added or existing processes may be removed, modified, or rearranged without departing from the scope and spirit of the present disclosure In one example, at block 510, in response to relaying the command to perform the test from the master server to the slave server, test data is received from the slave server. The test data may include a quantity, a pass/fail indication, or other data indicative of the test results. The test data is relayed from the master server to the computing device at block 512.

In another example, at block 514, a second slave server may be booted from the master server, as discussed above. The second slave server may be of the same or different configuration from the first slave server. Once the second slave server is booted, the command data may also be relayed from the master server to the second slave server at block 516. In one example, the command may be relayed from the master server to each slave server individually or one-at-a-time. In another example, the master server may send the command to all of the slave servers (or some subset of the slave servers) en mass such that the command is sent in a multi-cast fashion.

Figure 6:
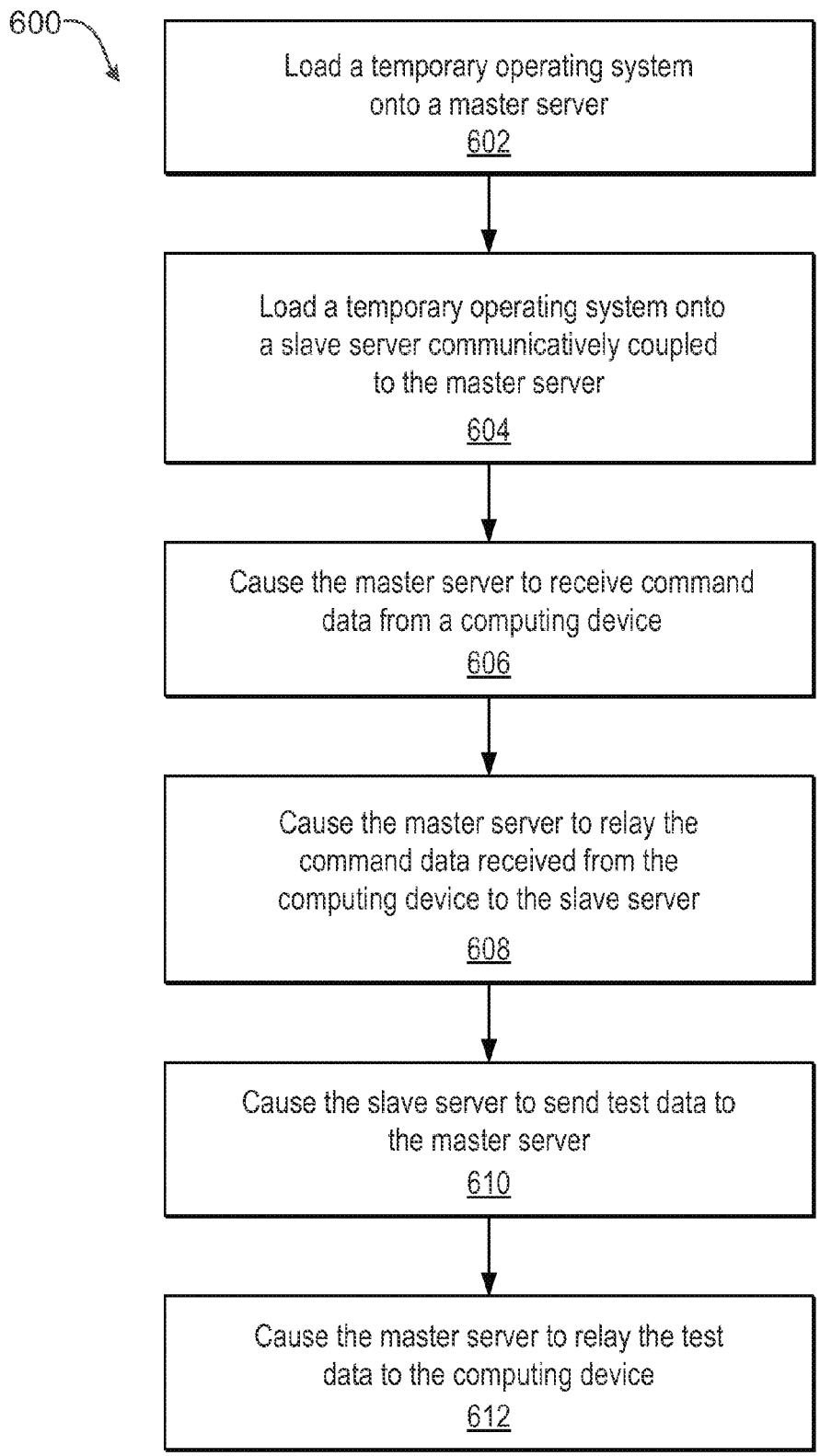
FIG. 6 illustrates a method for data relay by a server according to examples of the present disclosure.

FIG. 6 illustrates a method 600 for data relay by a server according to examples of the present disclosure. The method 600 may be performed by the system shown in FIGS. 1-3, for example, or by another suitable system. The method 600 may include: load a temporary operating system onto a master server (block 602); load a temporary operating system onto a slave server communicatively coupled to the master server (block 604); cause the master server to receive command data from a computing device (block 606); cause the master server to relay the command data received from the computing device to the slave server (block 608); cause the slave server to send test data to the master server (block 610); and cause the master server to relay the test data to the computing device (block 612). Additional processes also may be included, and it should be understood that the processes depicted in FIG. 6 represent generalized illustrations, and that other processes may be added or existing processes may be removed, modified, or rearranged without departing from the scope and spirit of the present disclosure.

At block 602, a temporary operating system is loaded onto a master server from a storage device. The storage device may be a memory stick, CD, DVD, RAMBUS module, or other similarly suitable storage device. In one example, a temporary operating system may be loaded onto multiple master servers.

At block 604, a temporary operating system is loaded onto a slave server that is communicatively coupled to the master server, such as through a network. The master server may relay the operating system from the storage device to the slave server, hi one example, a temporary operating system may be loaded onto multiple slave servers.

At block 606, the master server is caused to receive command data from a user via a user interface, such as on a computing device. For example, the user may select on the user interface a certain test to be run on the servers. The computing device may cause the command data to be sent to the master server, or multiple master servers for example.

Once the master server has received the command data, the master server is caused to relay the command data to the slave server at block 608. In one example, the command data may be caused to be relayed to multiple slave servers.

At block 610, the slave server may be caused to send test data to the master server. The test data may be indicative of the result of the test run on the slave server as selected by the user of the computing device.

At block 612, the master server may be caused to relay the test data to the computing device from the master server. The test data may then be displayed on the user interface of the computing device to the user.

It should be emphasized that the above-described embodiments are merely possible examples of implementations, set forth for a clear understanding of the principles of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
 booting a master server from a storage device;
 installing, from the storage device, a master temporary operating system on the master server;
 causing, by the master server, a slave server to boot;
 installing a slave temporary operating system on the slave server by communicating, from the master server, the slave temporary operating system to the slave server;
 receiving, in the master server, command data from a computing device; and
 relaying, by the master server, the command data to the slave server.

2. The method of claim 1, further comprising:
receiving test data from the slave server in response to relaying the command data from the master server to the slave server; and
relaying the received test data from the slave server to the computing device by the master server.

3. The method of claim 1, further comprising:
assigning, by the master server, an address to the slave server, wherein the master server and the slave server are to communicate via a network that utilizes the assigned address.

4. The method of claim 3, wherein the master server communicates with the slave server using a multi-cast communication protocol.

5. The method of claim 1, wherein receiving, in the master server, command data from the computing device further comprises receiving, in the master server, a test command to perform a test on the slave server; and wherein relaying the master server, the command data to the slave server further comprises relaying, by the master server, the test command to the slave server.

6. The method of claim 1, further comprising:
causing, by the master server, a second slave server to boot; and
relaying, by the master server, the command data to the second slave server.

7. The method of claim 6, further comprising:
receiving, by the master server, data from the second slave server in response to relaying the command from the master server to the second slave server; and
relaying, by the master server, the received data from the second slave server to the computing device.

8. The method of claim 6, further comprising installing the slave temporary operating system on the second slave server by communicating, from the master server, the slave temporary operating system to the second slave server.

9. A master server comprising:
a processor; and
a memory device containing a set of instructions that, when the memory device is communicatively coupled to the master server, cause the processor to:
load a temporary operating system onto the master server from the memory device;
cause at least one slave server to boot;
install a temporary operating system from the master server onto the at least one slave server;
receive a command from a computing device;
relay the command received from the computing device to the at least one slave server;
receive test data from the at least one slave server; and
relay the received test data to the computing device.

10. The master server of claim 9, wherein the instructions are further to cause the processor to:
assign, by the master server, an address to the at least one slave server, wherein the master server and the at least one slave server are to communicate via a network that utilizes the assigned address.

11. The master server of claim 10, wherein the command comprises a test command to perform a test on the at least one slave server and wherein the instructions are further to cause the processor to:
receive, from the computing device, the test command and to relay the test command to the at least one slave server.

12. The master server of claim 9, wherein the instructions are further to cause the processor to:
install a temporary operating system from the master server onto a second at least one slave server; and
relay the command received from the computing device to the second at least one slave server.

13. The master server of claim 12, wherein the instructions are further to cause the processor to:
receive data from the second at least one slave server; and
relay the received data from the second at least one slave server to the computing device.

14. A non-transitory computer-readable storage medium storing instructions that, when executed by a processor of a master server, cause the processor of the master server to:
load a temporary operating system from a storage device onto the master server;
cause a slave server to boot;
install a temporary operating system from the master server onto a slave server communicatively coupled to the master server;
receive command data from a computing device;
relay the command data received from the computing device to the slave server;
receive test data from the slave server; and
relay the test data from the slave server to the computing device.

15. The non-transitory computer-readable storage medium of claim 14, wherein the instructions are further to cause the processor of the master server to:
load a temporary operating system from the master server onto a second slave server.

* * * * *